No. 859,083. PATENTED JULY 2, 1907.
O. C. KNIPE.
BALL BEARING.
APPLICATION FILED MAR. 6, 1903.

WITNESSES:

INVENTOR:
Oliver C. Knipe.
by _____ Atty.

UNITED STATES PATENT OFFICE.

OLIVER C. KNIPE, OF NORRISTOWN, PENNSYLVANIA, ASSIGNOR TO THE PRESSED STEEL MANUFACTURING COMPANY, A CORPORATION OF NEW JERSEY.

BALL-BEARING.

No. 859,083.   Specification of Letters Patent.   Patented July 2, 1907.

Application filed March 6, 1903. Serial No. 146,453.

*To all whom it may concern:*

Be it known that I, OLIVER C. KNIPE, a citizen of the United States, residing at Norristown, in the county of Montgomery, State of Pennsylvania, have invented certain new and useful Improvements in Ball-Bearings, of which the following is a specification.

The object of the present invention is to provide a ball bearing in which the ball-race, balls and cone or other freely turning part which commonly carries a shaft form an unitary structure capable of easy mounting on a shaft or spindle in a box or other support.

In a prior patent issued to me, No. 546,818, dated Sept. 24, 1895, I described a ball-bearing composed of a divided race-way in which a circle of balls was confined or held together by a soft metal shell closed permanently over the race-way parts leaving a circular opening to admit a shaft or cone. The balls were retained in place by the sectional race-way which embraced more than half of each ball, leaving an annular groove through which the balls projected to engage the shaft or cone.

The present invention embraces the additional improvement of affording as part of the ball-race a cone which is permanently part of the structure, thus admitting of the use of the bearing on a simple cylindrical shaft with all the adavantages of a cone bearing. The cone is by preference hollow so that a cylindrical shaft may be forced into it.

The improvements are carried out by providing an annular race-way to receive the balls, against which latter bears a hardened hollow steel cone, a flanged soft metal shell inclosing the raceway and loosely confining the edge of the cone and being closed on the raceway to act as a permanent retainer for the parts and at the same time form a cushion to protect the hardened parts against breaking under shocks.

My bearing is a completed article of manufacture ready for application to a shaft with almost no machine work, and may be shipped and handled as a complete unit without danger of loss of parts.

My invention therefore comprises a ball-race or container providing in rolling relation a cone or similar rotary part held permanently and loosely in its seat.

It embodies also various other features the novelty of which will be particularly set forth in the appended claims.

Figure 1:
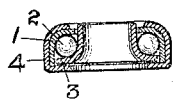
Figure 2:
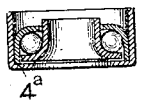
Figure 3:
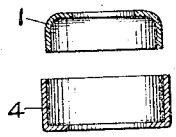

In the accompanying drawings, which illustrate one embodiment of the invention, Figure 1 is a sectional view of a completed device, and Figs. 2 and 3 are sectional views showing the method of assembling the parts.

Referring to the drawings, 1 represents a hardened steel raceway in the form of an annular cup open on the bottom and containing a circle of steel balls 2 and a cone 3. The cup and cone may be of case-hardened steel, the periphery or peripheral flange of the cone at its ends being of slightly smaller diameter than the interior diameter of the cup, to the end that it may roll freely on the balls without coming into frictional engagement with the edges of the cup. The cone is stamped or drawn with a cylindrical hole into which may be forced a shaft when the bearing is mounted for service. The cup is of sufficient depth to permit the cone when bearing on the balls to lie within a plane bounding the edge of the cup, as shown in the drawings.

Outside of the race is a soft steel or other metal shell 4 provided with an incurled flange 4ª to overlap the edge or flange of the cone and retain it in place, but shaped so that the cone when bearing on the balls will clear the flange. The shell when the parts are first assembled has a cylindrical wall, as in Fig. 2, but is closed down in a press so that its vertical edge curls over and tightly embraces the race, as seen in Fig. 1. Thus it will be seen that the cone and balls are permanently confined by the shell within the race, and that if a cylindrical shaft be driven in the opening through the cone an admirable type of thrust bearing is produced, which has the great merit of being very cheap and strong and absolutely true, since all of the parts are accurate press work.

It may be remarked that the part herein denominated for convenience a cone may in fact be a cylinder with a flat thrust collar; it is evident that this would be an obvious modification within the scope of my invention.

In assembling the parts prior to closing down the soft metal shell, the ball-race may be held mouth up with the finger or other obstruction closing the smaller opening and the balls dropped in. The cone is then inserted and the cup inverted, as in Fig. 2, and placed in a die, after which the edge of the shell may be closed down forming the completed article.

What I claim as new and desire to secure by Letters Patent of the United States is,

1. A ball bearing comprising an annular cup of pressed steel, an annular bearing member of pressed steel with a portion projecting through and a peripheral flange disposed within the cup, balls between said flange and cup, and a casing of soft metal having one end contracted to engage the cup and the other end flanged to form a retainer for the bearing member.

2. A ball bearing comprising a hardened pressed steel cup, a hardened pressed steel cone having a flange lying within said cup, balls between said cone and cup, and a casing of soft metal having one end contracted to closely engage one end of the cup and the other end flanged over the other end of the cup so as to form an annular retainer overlapping the flange of the cone to retain the latter.

In witness whereof I have hereunto set my hand this 18th day of February, 1903.

OLIVER C. KNIPE.

Witnesses:
J. BARTON RETTEW,
O. W. PAXHAN.